(12) United States Patent
Liang

(10) Patent No.: US 12,265,671 B2
(45) Date of Patent: Apr. 1, 2025

(54) WIRELESS COMMUNICATION METHOD AND ACTIVE PEN

(71) Applicant: Shenzhen Goodix Technology Co., Ltd., Guangdong (CN)

(72) Inventor: Qiquan Liang, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/433,264

(22) Filed: Feb. 5, 2024

(65) Prior Publication Data
US 2024/0176443 A1 May 30, 2024

Related U.S. Application Data

(63) Continuation of application No. 18/063,617, filed on Dec. 8, 2022, now Pat. No. 11,928,279, which is a
(Continued)

(51) Int. Cl.
*G06F 3/041* (2006.01)
*G06F 3/0354* (2013.01)
*G06F 3/038* (2013.01)

(52) U.S. Cl.
CPC ...... *G06F 3/04162* (2019.05); *G06F 3/03545* (2013.01); *G06F 3/0383* (2013.01); *G06F 2203/0384* (2013.01)

(58) Field of Classification Search
CPC .................................................. G06F 3/03545
See application file for complete search history.

(56) References Cited

U.S. PATENT DOCUMENTS

| | | |
|---|---|---|
| 10,719,145 B1 | 7/2020 | Files et al. |
| 2013/0009912 A1 | 1/2013 | Han et al. |
| 2017/0192591 A1 | 7/2017 | Jang et al. |

FOREIGN PATENT DOCUMENTS

| | | |
|---|---|---|
| CN | 102866796 A | 1/2013 |
| CN | 104541235 A | 4/2015 |

(Continued)

OTHER PUBLICATIONS

Shenzhen Goodix Technology Co.,Ltd., International Search Report with English translation, PCT/CN2020/115111, Jun. 11, 2021, 6 pgs.
(Continued)

*Primary Examiner* — Gustavo Polo
(74) *Attorney, Agent, or Firm* — USCH Law, PC

(57) ABSTRACT

The present disclosure provides a method for wireless communication, which is applicable to wireless communication between the active pen and the plurality of touch screens, the plurality of touch screens respectively correspond to a plurality of wireless channels, a respective wireless channel is used for wireless communication between a touch screen and the active pen, and the method includes: the active pen sends a coding signal to the first touch screen; the active pen receives a wireless signal sent by the first touch screen, the wireless signal carries identification information of the first touch screen; the active pen identifies the first touch screen that is currently close to or in contact with the active pen according to the identification information of the first touch screen; and the active pen sends a wireless message to the first touch screen through the wireless channel corresponding to the first touch screen.

16 Claims, 6 Drawing Sheets

Related U.S. Application Data continuation of application No. PCT/CN2020/115111, filed on Sep. 14, 2020.

(56) References Cited

FOREIGN PATENT DOCUMENTS

| | | | |
|---|---|---|---|
| CN | 104571732 | A | 4/2015 |
| CN | 105549766 | A | 5/2016 |
| CN | 106293220 | A | 1/2017 |
| CN | 106557185 | A | 4/2017 |
| CN | 107861651 | A | 3/2018 |
| CN | 111290665 | A | 6/2020 |
| CN | 111427463 | A | 7/2020 |
| KR | 20130136680 | A | 12/2013 |
| WO | 2020024273 | A1 | 2/2020 |

OTHER PUBLICATIONS

Shenzhen Goodix Technology Co.,Ltd., Non-Final Rejection, U.S. Appl. No. 18/063,617, filed Jul. 28, 2023, 8 pgs.
Shenzhen Goodix Technology Co.,Ltd., CN First Office Action with English translation, CN 2020109620537, Nov. 25, 2020, 20 pgs.

WIRELESS COMMUNICATION METHOD AND ACTIVE PEN

CROSS REFERENCE TO RELATED APPLICATIONS

The present application is a continuation of U.S. patent application Ser. No. 18/063,617, filed on Dec. 8, 2022, which is a continuation of PCT Patent Application No. PCT/CN2020/115111, entitled "WIRELESS COMMUNICATION METHOD, ACTIVE PEN, TOUCH SCREEN, ELECTRONIC DEVICE AND COMMUNICATION SYSTEM," filed on Sep. 14, 2020, each of which is incorporated herein by reference in its entirety.

TECHNICAL FIELD

Embodiments of the present disclosure relate to the field of information technology, and in particular to a method for wireless communication, an active pen, a touch screen, an electronic device and a communication system.

BACKGROUND

Currently, active pens, as the main input peripheral for electronic devices, have gradually attracted the interest of the consumer. A tip of an active pen emits signals, and a certain number of detection electrodes arranged in horizontal and vertical directions are distributed on a touch screen. Therefore, the signals emitted from the tip can be detected by the detection electrodes and two-dimensional position coordinates of the tip on the touch screen can be calculated according to detected signals.

Typically, the active pen may also be provided with a pressure sensor to detect a pressure generated by the active pen and adjust the active pen's trajectory on the touch screen according to the pressure. The pressure detected by the pressure sensor may be transmitted to the touch screen by means of wireless communication. When there is a plurality of touch screens, how to realize accurate transmission of pressure information by the active pen becomes an urgent problem to be solved.

SUMMARY

Embodiments of the present disclosure provide a method for wireless communication, an active pen, a touch screen, an electronic device, and a communication system that can realize accurate transmission of wireless messages between the active pen and a plurality of touch screens.

In a first aspect, a method for wireless communication is provided, the method is applicable to wireless communication between the active pen and the plurality of touch screens. The plurality of touch screens and the active pen respectively corresponding to a plurality of wireless channels, and a respective wireless channel is used for wireless communication between a touch screen and the active pen. The method includes:
  sending, by the active pen, a coding signal to a first touch screen, the coding signal is configured for the first touch screen to determine information on a position of the active pen on the first touch screen;
  receiving, by the active pen, a wireless signal sent by the first touch screen, the wireless signal is transmitted through a wireless channel corresponding to the active pen and carries identification information of the first touch screen;
  detecting, by the active pen, among the plurality of touch screens, the first touch screen that is currently close to or in contact with the active pen according to the identification information of the first touch screen; and
  sending, by the active pen, a wireless message to the first touch screen through a wireless channel corresponding to the first touch screen.

In some embodiments, the identification information is a device identification corresponding to the first touch screen or a channel identification of the wireless channel corresponding to the first touch screen.

In some embodiments, the wireless message includes information on a pressure generated by the active pen on the first touch screen.

In some embodiments, the active pen sends the coding signal to the first touch screen, including: sending, by the active pen, the coding signal to the first touch screen, and in response to the active pen being within a preset distance from the first touch screen, receiving, by the first touch screen, the coding signal. The preset distance is less than or equal to 10 mm.

In some embodiments, the active pen sends the coding signal to the first touch screen, including: in response to the active pen being within a preset distance from the first touch screen, sending, by the active pen, the coding signal to the first touch screen in a designated period of time after an uplink signal being detected. The preset distance is less than or equal to 10 mm.

In some embodiments, the preset distance ranges from 5 mm to 10 mm.

In some embodiments, the active pen receives the wireless signal sent by the first touch screen in response to the coding signal is detected by the first touch screen, including: in response to the first touch screen detecting that a strength of the coding signal is greater than a first threshold and a number of times that the coding signal is detected is greater than a second threshold, receiving, by the active pen, the wireless signal sent by the first touch screen. The first threshold and the second threshold are each greater than 0.

In some embodiments, the method further includes:
  in response to the active pen switching from the first touch screen to a second touch screen of the plurality of touch screens, sending, by the active pen, the coding signal to the second touch screen;
  receiving, by the active pen, a wireless signal sent by the second touch screen, the wireless signal is transmitted through the wireless channel corresponding to the active pen and carries identification information of the second touch screen;
  detecting, by the active pen, that the active pen has switched from the first touch screen to the second touch screen according to the identification information of the second touch screen different from the identification information of the first touch screen; and
  sending, by the active pen, the wireless message to the second touch screen through a wireless channel corresponding to the second touch screen.

In some embodiments, the wireless signal includes a plurality of bits, and the plurality of bits includes an identification segment for representing the identification information.

In some embodiments, the plurality of bits further includes at least one of a check segment, an auxiliary command segment, and a command header segment.

In some embodiments, the command header segment is configured to represent a pressure request of the first touch screen.

In some embodiments, the wireless communication includes Bluetooth communication.

In a second aspect, a method for wireless communication is provided, the method is applicable to wireless communication between a first touch screen of a plurality of touch screens and an active pen. The plurality of touch screens respectively corresponding to a plurality of wireless channels, a respective wireless channel is used for wireless communication between a touch screen and the active pen. The method includes:

detecting, by the first touch screen, a coding signal sent by the active pen, the coding signal is configured for the first touch screen to determine information on a position of the active pen on the first touch screen;

in response to the coding signal being detected by the first touch screen, sending, by the first touch screen, a wireless signal to the active pen, the wireless signal is transmitted through a wireless channel corresponding to the active pen and carries identification information of the first touch screen, and the identification information of the first touch screen is configured for the active pen to detect, among the plurality of touch screens, the first touch screen that is currently close to or in contact with the active pen; and receiving, by the first touch screen, a wireless message sent by the active pen through a wireless channel corresponding to the first touch screen.

In some embodiments, the identification information is a device identification corresponding to the first touch screen or a channel identification of the wireless channel corresponding to the first touch screen.

In some embodiments, the wireless message includes information on a pressure generated by the active pen on the first touch screen.

In some embodiments, the first touch screen detects the coding signal sent by the active pen, including: in response to the first touch screen being within a preset distance from the active pen, receiving, by the first touch screen, the coding signal sent by the active pen. The preset distance is less than or equal to 10 mm.

In some embodiments, the first touch screen detects the coding signal sent by the active pen, including: sending, by the first touch screen, an uplink signal to the active pen; in response to the first touch screen being within a preset distance from the active pen, the active pen receives the uplink signal; and receiving, by the first touch screen, the coding signal sent by the active pen in a designated period of time after the first touch screen sends the uplink signal. The preset distance is less than or equal to 10 mm.

In some embodiments, the preset distance ranges from 5 mm to 10 mm.

In some embodiments, the first touch screen sends the wireless signal to the active pen in response to the coding signal being detected by the first touch screen, including: in response to the first touch screen detecting that a strength of the coding signal is greater than a first threshold and a number of times that the coding signal is detected is greater than a second threshold, sending, by the first touch screen, the wireless signal carrying the identification information of the first touch screen to the active pen. The first threshold and the second threshold are each greater than 0.

In some embodiments, the method further includes:

in response to the active pen switching from the first touch screen to a second touch screen of the plurality of touch screens, detecting, by the second touch screen, the coding signal sent by the active pen;

in response to the coding signal being detected by the second touch screen, sending, by the second touch screen, a wireless signal to the active pen; the wireless signal is transmitted through the wireless channel corresponding to the active pen and carries identification information of the second touch screen, the identification information of the second touch screen is different from the identification information of the first touch screen, to enable the active pen to detect a switching from the first touch screen to the second touch screen; and receiving, by the second touch screen, the wireless message sent by the active pen through a wireless channel corresponding to the second touch screen.

In some embodiments, the wireless signal includes a plurality of bits, and the plurality of bits includes an identification segment for representing the identification information.

In one possible implementation, the plurality of bits further includes at least one of a check segment, an auxiliary command segment, and a command header segment.

In some embodiments, the wireless communication includes Bluetooth communication.

In a third aspect, an active pen chip is provided, including: the method for wireless communication in the first aspect and in any one of the embodiments in the first aspect.

In a fourth aspect, a touch chip is provided, including: the method for wireless communication in the second aspect and in any one of the embodiments in the second aspect.

Based on the above technical solution, after the coding signal sent by the active pen is detected by the touch screen, the touch screen sends a wireless signal carrying the identification information of the touch screen to the active pen through the wireless channel corresponding to the touch screen. The active pen identifies, among the plurality of touch screens, the touch screen that is currently close to or in contact with the active pen, and sends the wireless message to the touch screen using the wireless channel corresponding to the touch screen. In this way, accurate transmission of the wireless message between the active pen and the plurality of touch screens can be realized.

DETAILED DESCRIPTION OF THE EMBODIMENTS

The technical solutions in the present disclosure will be described below in conjunction with the accompanying drawings.

Figure 1:
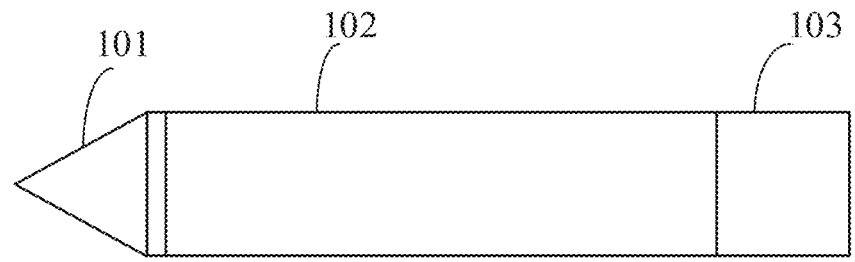
FIG. 1 is a schematic diagram of an active pen.
Figure 2:
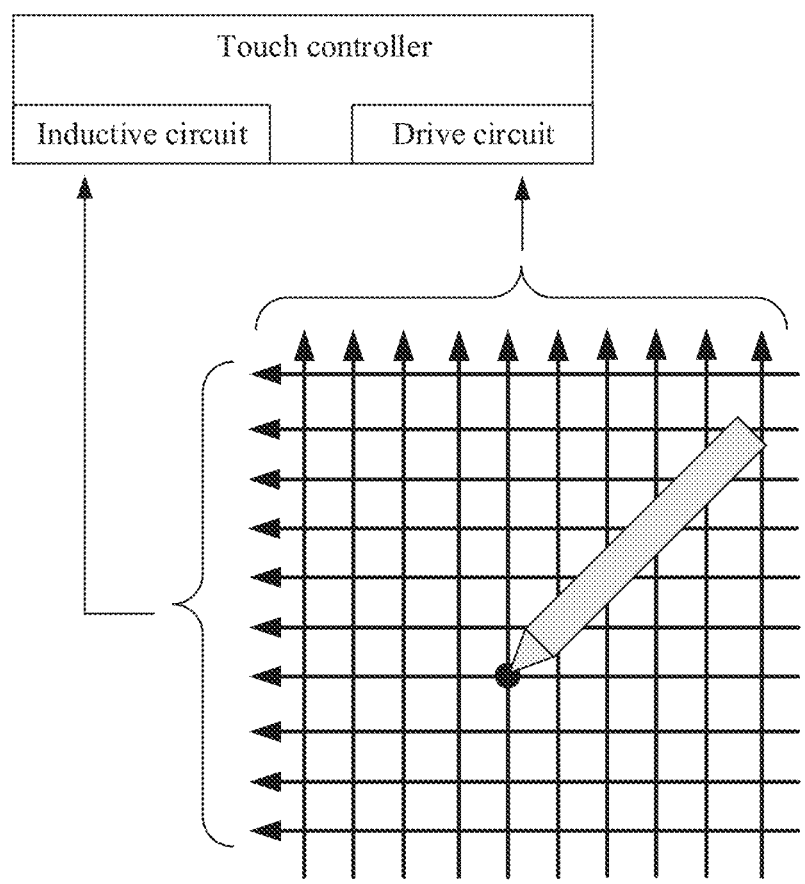
FIG. 2 is a schematic diagram of the active pen when using on a touch screen.

FIG. 1 is a schematic diagram of an active pen 100. The active pen 100 includes a tip 101, a body 102 and a wireless communication module 103. Herein, the tip 101 may emit a coding signal outwardly through an electrode, and after being detected by a touch screen, the coding signal may be used to calculate coordinates of the active pen 100 on the touch screen. As shown in FIG. 2, a certain number of detection electrodes in vertical and horizontal directions are distributed on the touch screen. The detection electrodes may be, for example, drive electrodes and inductive electrodes of a mutual capacitive touch screen, which are connected to a drive circuit and an inductive circuit, respectively. When the coding signal sent by the tip 101 acts on a certain position on the screen, a horizontal electrode and a vertical electrode corresponding to the position may generate a corresponding detection signal, and a touch controller may calculate a two-dimensional position coordinate of the active pen 100 on the screen according to the detection signal.

The tip 101 is also connected with a pressure sensor. The pressure sensor is configured to detect a pressure generated by the active pen 100 on the touch screen, so that the active pen 100 may sense the change in the user's writing strength and the touch screen may change a width of the trajectory according to the change in writing strength, so as to obtain an excellent user experience. The pressure information sent by the active pen 100 may be sent to an electronic device through the wireless communication module 103 in the active pen 100, and the electronic device may adjust the trajectory of the active pen 100 on the touch screen according to this pressure. When detecting the pressure generated by the active pen 100, the pressure sensor may send the pressure information to the electronic device via the wireless communication module 103.

It should be understood that the pressure generated by the active pen as described in the embodiments of the present disclosure refers to a pressure applied by the user through the active pen, i.e., the user's writing pressure. The user may apply pressure to the touch screen through the active pen, and depending on the pressure, different trajectory of the active pen may be presented on the touch screen. This pressure is detected through the pressure sensor in the active pen.

Generally, a process of establishing a connection is necessary to wireless communication. After a wireless connection is established between the active pen and the touch screen, corresponding wireless channels are assigned to the touch screen and the active pen, respectively, and a wireless message between the active pen and the touch screen are transmitted through the wireless channel.

In practice, when there is a plurality of touch screens, if it is desired that the active pen may be used on the plurality of touch screens alternately, the active pen needs to establish a wireless connection with the plurality of touch screens. However, since the active pen cannot detect which touch screen it is currently close to or in contact with, the active pen is unable to determine through which wireless channel to send the pressure information of the active pen, which greatly limits the use of the active pen.

Embodiments of the present disclosure provide a method for wireless communication that can realize accurate transmission of the wireless message between the active pen and the plurality of touch screens.

The respective operations performed by the active pen and the touch screen in the method for wireless communication according to the embodiments of the present disclosure are described below in conjunction with FIGS. 3 and 4.

Figure 3:
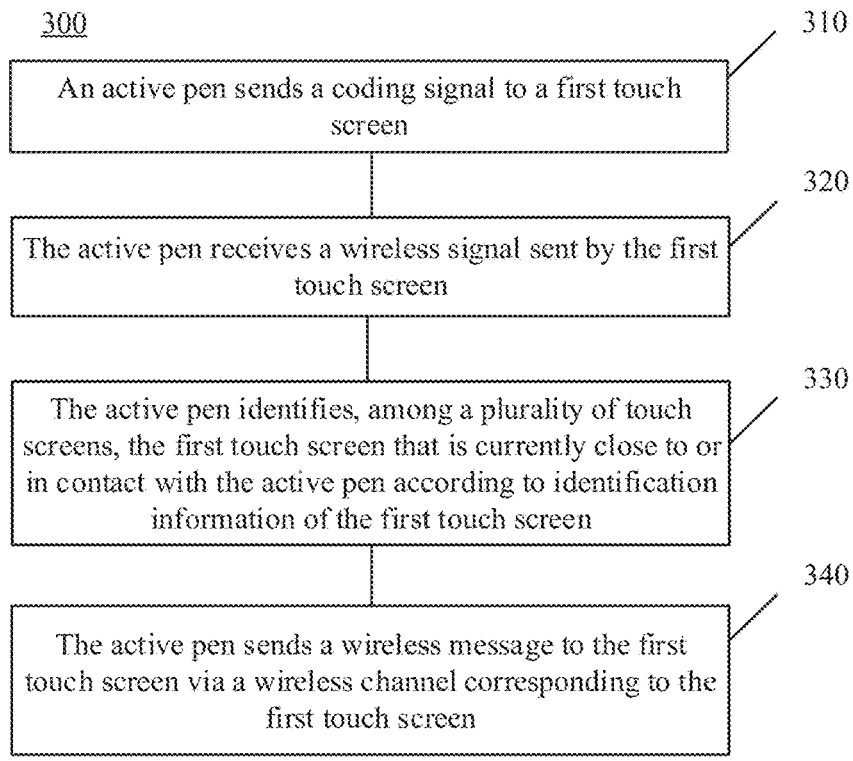
FIG. 3 is a schematic flowchart of a method for wireless communication according to some embodiments of the present disclosure.

FIG. 3 is a schematic flowchart of a method 300 for wireless communication according to some embodiments of the present disclosure. The method may be conducted by the active pen. The method is used for wireless communication between the active pen and the plurality of touch screens. Herein, the plurality of touch screens correspond to a plurality of wireless channels, respectively, each of the plurality of wireless channels is used for wireless communication between a corresponding touch screen and the active pen. As shown in FIG. 3, the method 300 may include some or all of the following operations.

In operation 310, the active pen sends a coding signal to a first touch screen.

Herein, the coding signal is configured for the first touch screen to determine information on a position of the active pen on the first touch screen.

In operation 320, the active pen receives a wireless signal sent by the first touch screen. Herein, the wireless signal is transmitted through a wireless channel corresponding to the active pen and carries identification information of the first touch screen.

The identification information is a device identification corresponding to the first touch screen or a channel identification of the wireless channel corresponding to the first touch screen.

The identification information is specified in a communication protocol, which may be, for example, a Bluetooth or wireless fidelity (Wi-Fi) communication protocol.

In operation 330, the active pen identifies, among the plurality of touch screens, the first touch screen that is currently close to or in contact with the active pen according to the identification information of the first touch screen.

In operation 340, the active pen sends a wireless message to the first touch screen via a wireless channel corresponding to the first touch screen.

Herein, the wireless message includes information on a pressure generated by the active pen on the first touch screen.

The active pen may be paired with or connected to the plurality of touch screens, but at a given moment, the active pen may only be used on one of the plurality of touch screens. Thus, the active pen may perform wireless communicate with only one touch screen at that moment to deliver the wireless message.

When the active pen is paired with or connected to the plurality of touch screens, the system assigns the wireless channels to each of the plurality of touch screens and the active pen. For the touch screens, the wireless signal may be transmitted through the wireless channel corresponding to the active pen, while for the active pen, the active pen needs to perform wireless communicate with a touch screen of the plurality of touch screens through the wireless channel corresponding to the touch screen. Therefore, it is necessary for the active pen to detect on which touch screen it is currently used and send the wireless message to the touch screen through the wireless channel corresponding to the touch screen. In this way, the wireless message can be accurately transmitted to that touch screen.

In some embodiments, the active pen sends the coding signal to the first touch screen, receives the wireless signal sent by the first touch screen over the wireless channel corresponding to the active pen, and identifies, among the plurality of touch screens, the first touch screen that is currently close to or in contact with the active pen according to the identification information carried in the wireless signal, so as to send the wireless message to the first touch screen through the wireless channel corresponding to the first touch screen. The identification information is the identification information corresponding to the first touch screen, and the active pen identifies the first touch screen through the wireless signal sent by the first touch screen and transmits the wireless message to the first touch screen. In this way, accurate transmission of the wireless message can be realized.

Figure 4:
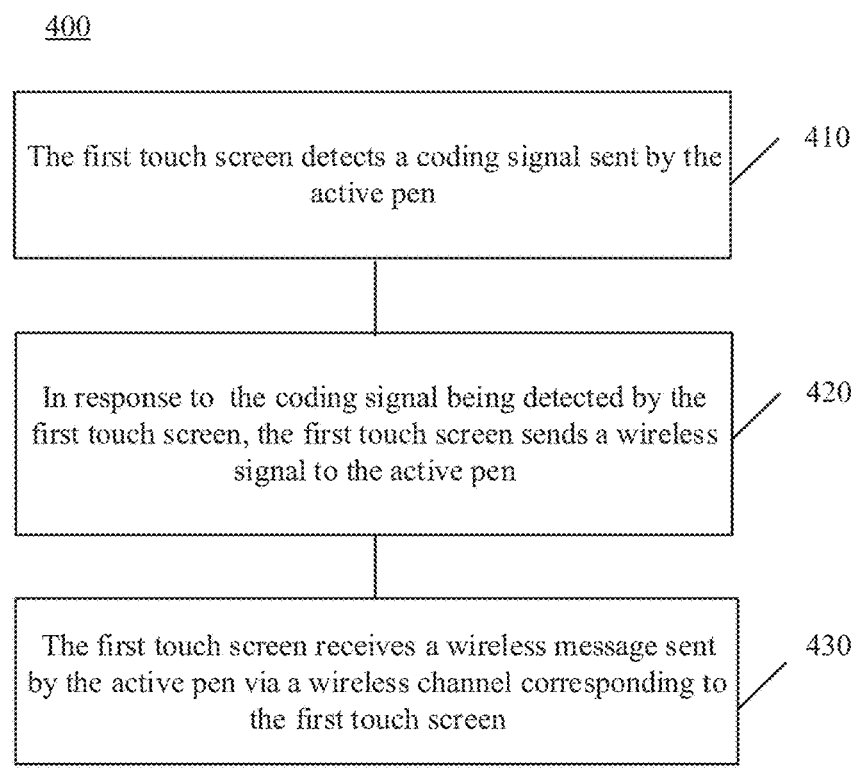
FIG. 4 is a schematic flowchart of a method for wireless communication according to some embodiments of the present disclosure.

FIG. 4 is a schematic flowchart of a method 400 for wireless communication according to some embodiments of the present disclosure. The method may be performed by a first touch screen of a plurality of touch screens. The method is used for wireless communication between the first touch screen and the active pen. Here, the first touch screen is taken as an example to describe, and the operations performed by other touch screens of the plurality of touch screens may refer to the operations performed by the first touch screen, which will not be repeated for the sake of brevity. As shown in FIG. 4, the method 400 may include some or all of the following operations.

In operation 410, the first touch screen detects a coding signal sent by the active pen.

Herein, the coding signal is configured for the first touch screen to determine information on a position of the active pen on the first touch screen.

In operation 420, in response to the coding signal being detected by the first touch screen, the first touch screen sends a wireless signal to the active pen.

Herein, the wireless signal is transmitted through the wireless channel corresponding to the active pen and carries identification information of the first touch screen. The identification information of the first touch screen is configured for the active pen to detect the first touch screen that is currently close to or in contact with the active pen among the plurality of touch screens.

The identification information is the device identification corresponding to the first touch screen or the channel identification of the wireless channel corresponding to the first touch screen.

The identification information is specified in a communication protocol, which may be, for example, a Bluetooth or wireless fidelity (Wi-Fi) communication protocol.

In operation 430, the first touch screen receives a wireless message sent by the active pen via a wireless channel corresponding to the first touch screen.

Herein, the wireless message includes information on a pressure generated by the active pen on the first touch screen.

In some embodiments, after the coding signal being detected by the first touch screen, the first touch screen sends the wireless signal carrying the identification information of the first touch screen to the active pen through the wireless channel corresponding to the active pen, so that the active pen can detect the first touch screen among the plurality of touch screens according to the identification information.

After detecting the coding signal sent by the active pen, the first touch screen sends the wireless signal carrying the identification information to the active pen through the wireless channel corresponding to the active pen. The active pen identifies the first touch screen according to the identification information and sends the wireless message to the first touch screen through the wireless channel corresponding to the first touch screen. The first touch screen receives the wireless message, such as pressure information, sent by the active pen through the wireless channel corresponding to the first touch screen, so as to output trajectories in real time according to the coding signal and pressure information.

In some embodiments, the method 310 includes: the active pen sends the coding signal to the first touch screen, and in response to the active pen being within a preset distance from the first touch screen, the first touch screen receives the coding signal; or in response to the active pen being within the preset distance from the first touch screen, the active pen sends the coding signal to the first touch screen within a designated period of time after the uplink signal sent by the first touch screen being detected by the active pen. Herein, the preset distance is less than or equal to 10 mm.

The uplink signal may also be referred to as an uplink command, which usually refers to a signal sent by the detection electrode of the touch screen to the active pen. Accordingly, the method 410 includes: in response to the first touch screen being within the preset distance from the active pen, the coding signal sent by the active pen is detected by the first touch screen; or the first touch screen sends the uplink signal to the active pen, in response to the first touch screen being within the preset distance from the active pen, the active pen receives the uplink signal, and the first touch screen receives the coding signal sent by the active pen in a designated period of time after the first touch screen sends the uplink signal. Herein, the preset distance is less than or equal to 10 mm.

In some embodiments, the preset distance ranges from 5 mm to 10 mm. If the preset distance is set too small, it is likely to cause fake coordinates on the touch screen. The above-mentioned distance range can effectively prevent the problem of fake coordinates on the touch screen when the active pen is approaching the touch screen.

In other words, the active pen may code on the touch screen periodically or based on the uplink signal sent by the touch screen.

Figure 5:
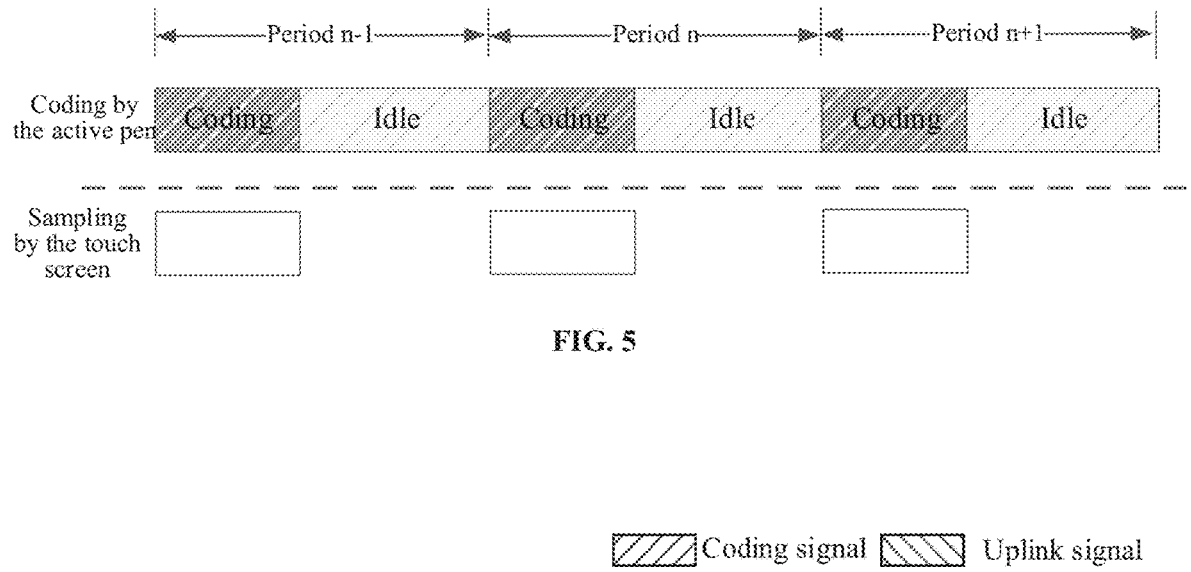
FIG. 5 is a timing diagram of a coding signal between the active pen and a touch screen.

There are two types of active pens. The first type of active pens is configured to code periodically. As shown in FIG. 5, this type of active pens periodically sends the coding signal to the touch screen and use an interaction protocol without the uplink signal. The touch screen detects the coding signal based on the same period, and the coding signal is used for coordinate positioning on the touch screen. The coordinate information may be obtained by the touch screen by periodically sampling in timing sequence.

The second type of active pens are configured to trigger coding with the uplink signal. Some touch screens may send the uplink signal to the active pen through the detection electrode, thus the active pen of this type would not send the coding signal to the touch screen until the uplink signal sent by the touch screen is detected. The active pen parses the detected uplink signal to obtain synchronization command information in the uplink signal, and sends the coding signal based on this synchronization command information after a fixed time delay to enable the touch screen to calculate the position coordinates of the active pen. Accordingly, the touch screen starts to detect the coding signal after a fixed time delay starting from the uplink signal being sent, and sends a wireless signal carrying the identification information of the touch screen to the active pen through the wireless channel corresponding to the touch screen according to the detected coding signal.

Figure 6:
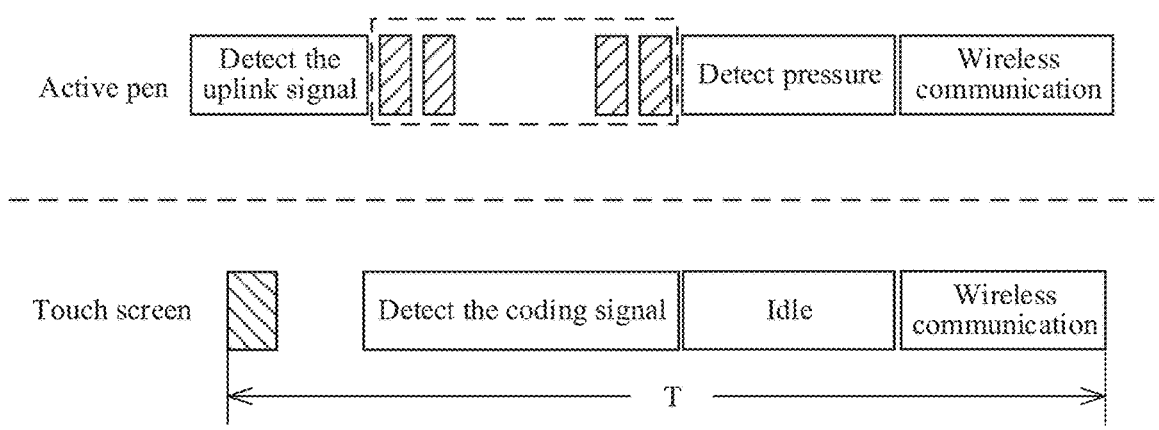
FIG. 6 is a timing diagram of an uplink signal and a coding signal between the active pen and a touch screen.

As shown in FIG. 6, taking one period T as an example, the touch screen sends the uplink signal and the active pen detects the uplink signal. In response to the active pen successfully detecting the uplink signal sent by the touch screen, the active pen sends the coding signal to the touch screen in a designated period of time after the fixed time delay. The fixed time delay may be determined based on a signal processing time of the active pen, the signal processing time is configured for the active pen to process the uplink signal and prepare the coding signal. The active pen continuously sends the coding signal during this designated period of time.

During the sending of the coding signal by the active pen, the pressure sensor in the active pen may detect the pressure generated by the active pen and send the pressure information via the wireless communication module. Alternatively, the detection of the pressure and the sending of the pressure information of the active pen may be performed after sending the coding signal by the active pen. The embodiments of the present disclosure do not make any limitation on the time of performing pressure detection. Time of sending the coding signal by the active pen is based on a detection result of the uplink signal by the active pen, but the time of pressure detection may not be limited by the detection result of the uplink signal. The pressure detection may have individual timing, and the active pen may perform pressure detection based on, for example, a preset sampling frequency and sampling period.

The "coding" here means "sending a coding signal" and the coding signal may also be called as a driving signal. The coding signal sent by the electrode on the tip may be, for example, a square wave, a sine wave or a triangle wave, and an actual frequency of the coding signal may be, for example, between a few tens of KHz and a few hundreds of KHz.

The active pen and the touch screen interact with each other by means of wireless communication. The active pen may transmit the wireless message with the touch screen through the wireless communication module. The wireless message may include the aforementioned pressure information, or may include the pressure information and keystroke information of the active pen.

Herein, the wireless communication between the active pen and the touch screen may be understood as wireless communication between the active pen and a master device of the touch screen. The master device may be, for example, an electronic device using the touch screen, such as a cell phone, a tablet computer, etc. For example, sending of the wireless message by the active pen to the first touch screen may refer to that the active pen sends the wireless message to the master device of the touch screen, and the master device of the touch screen forwards the wireless message to the touch screen. Receiving, by the first touch screen, of the wireless message sent by the active pen may refer to that the first touch screen receives the wireless message by means of its master device.

The wireless communication may be, for example, Bluetooth communication, such as Bluetooth low energy (BLE) communication, or wireless fidelity (Wi-Fi) communication, etc.

The embodiments of the present disclosure do not limit the identification information, as long as the first touch screen or the wireless channel corresponding to the first touch screen can be uniquely identified by the identification information. For example, the identification information corresponding to the first touch screen may be the device identification corresponding to the first touch screen. The device identification corresponding to the first touch screen may be, for example, the identification of the first touch screen, and different touch screens have different identification. Alternatively, the device identification corresponding to the first touch screen is identification of the master device using the first touch screen, and different master devices have different identification. In another example, the identification information corresponding to the first touch screen may be the channel identification of the wireless channel corresponding to the first touch screen. The system assigns different wireless channels to different touch screens, and the channel identification of different wireless channels are different.

The wireless signal sent by the first touch screen includes a plurality of bits, and the plurality of bits includes an identification segment for representing the identification information. Further, the plurality of bits may also include at least one of a check segment, an auxiliary command segment, and a command header segment.

Figure 7:
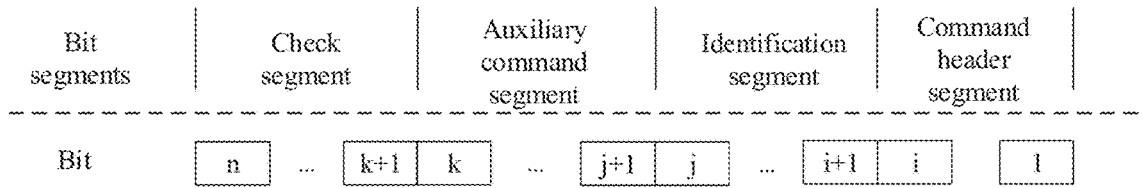
FIG. 7 is a schematic diagram of a wireless signal.

For example, the wireless signal as shown in FIG. 7 includes n bits, i.e., bit 1 to bit n. Each of the bits may represent a number. In a case of binary, each of the bits may represent one of two different numbers, 1 or 0. In a case of ternary, each of the bits may represent one of three different numbers. The following are described with binary as an example. The n bits may be divided into a plurality of segments, each of which is used to represent different contents. In other words, the n bits are divided into a plurality of fields, each of which includes a number of bits. In FIG. 7, four segments are taken as an example, namely the check segment, the auxiliary command segment, the identification segment and the command header segment.

The check segment is configured for the active pen to check the uplink signal, to ensure that the detected signal is the wireless signal coming from the touch screen. Only after a successful check, the wireless message may be transmitted according to the information carried in the wireless signal.

The auxiliary command segment is configured to carry other auxiliary information, such as frequency hopping information.

The identification segment is configured to carry the identification information corresponding to the touch screen, such as the device identification or channel identification corresponding to the touch screen. It can be agreed that when the identification segment is valued by a specific value, it means that no identification information is carried. For example, when all the bits of the identification segment are valued by 0, it means that no identification information is carried in the wireless signal.

The command header segment is configured to represent a pressure request of the first touch screen and is a beginning of an identification command.

It should be understood that in the embodiments of the present disclosure, none of the segments other than the identification segment is necessary.

In some embodiments, in operation 320, the active pen receives the wireless signal sent by the first touch screen in response to the coding signal being detected by the first touch screen, including: the active pen receives the wireless signal sent by the first touch screen in response to the first touch screen detecting that a strength of the coding signal is greater than a first threshold and a number of times that the coding signal is detected is greater than a second threshold. The wireless signal carries identification information of the first touch screen.

Since the plurality of touch screens may be located in close proximity, this may cause that when the active pen sends the coding signal to the first touch screen that is close to or in contact with the active pen, other touch screens adjacent to the first touch screen may also detect the coding signal. However, a signal strength of the coding signal detected by the first touch screen is different from that of the coding signal detected by other adjacent touch screens, and the signal strength of the coding signal detected by the first touch screen is the greatest. Therefore, the first touch screen may determine whether the coding signal is the coding signal expected to be sent to the first touch screen by the active pen by determining the signal strength of the coding signal detected by the first touch screen. When the signal strength of the coding signal is greater than the first threshold, the coding signal is detected as a valid coding. When the number of the valid coding signal is greater than the second threshold, the first touch screen may carry its identification information in its wireless signal. Alternatively, when the signal strength of the coding signal is less than the first threshold or the number of the valid coding signal is less than the second threshold, the first touch screen may not carry the identification information in its wireless signal. Herein, the first threshold and the second threshold are greater than 0, respectively, and the values of the first threshold and the second threshold may be set as needed.

In some embodiments, only when detecting that the strength of the coding signal is greater than the first threshold and the number of times that the coding signal is detected is greater than the second threshold, the first touch screen sends the wireless signal to the active pen. This is to ensure that the received coding signal is stable and prevent the problem of fake coordinates due to noise interference.

Figure 8:
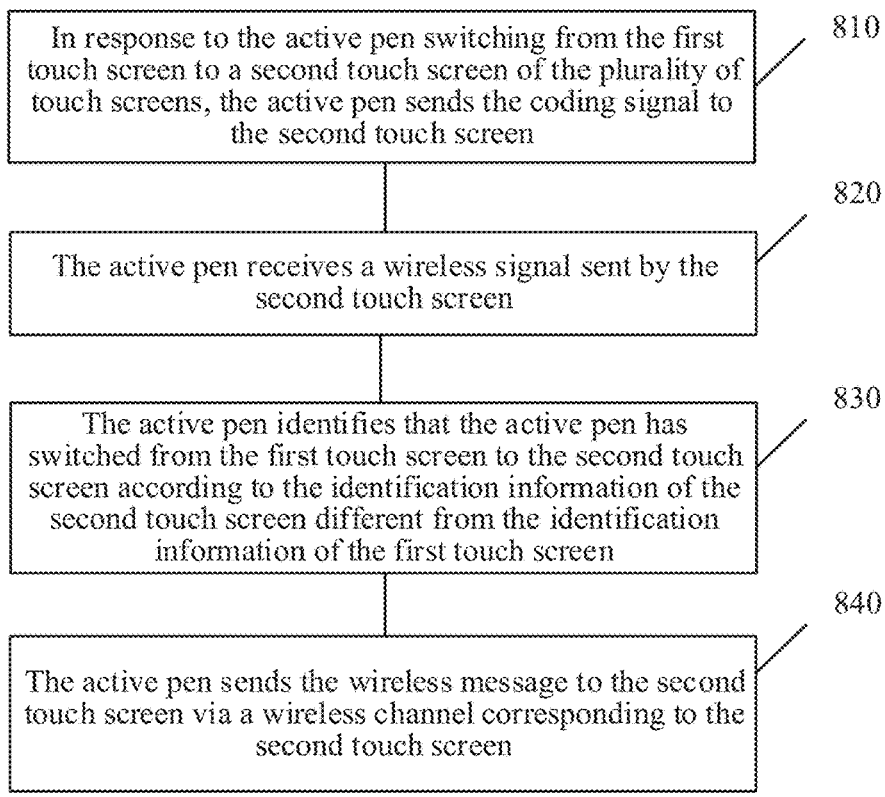
FIG. 8 is a schematic diagram of a method for wireless communication according to some embodiments of the present disclosure.

Some embodiments of the method 300 are shown in FIG. 8. The process as shown in FIG. 8 is performed by the active pen.

In operation 810, in response to the active pen switching from the first touch screen to a second touch screen of the plurality of touch screens, the active pen sends the coding signal to the second touch screen.

In operation 820, the active pen receives a wireless signal sent by the second touch screen.

Herein, the wireless signal is transmitted through the wireless channel corresponding to the active pen and carries identification information of the second touch screen.

In operation 830, the active pen identifies that the active pen has switched from the first touch screen to the second touch screen according to the identification information of the second touch screen different from the identification information of the first touch screen.

In operation 840, the active pen sends the wireless message to the second touch screen via a wireless channel corresponding to the second touch screen.

Since the identification information of the first touch screen is different from the identification information of the second touch screen, the active pen can detect that the paired touch screen has been switched by detecting the change in the identification information. The active pen identifies the touch screen on which pressure is to be applied according to the identification information carried in the wireless signal sent by the touch screen. In this way, a quick switch of the active pen among the plurality of touch screens with which connections have been established can be achieved.

If the active pen identifies that the identification information has no change, the active pen maintains the current wireless channel, that is, the active pen continues to use the current wireless channel to send the wireless message.

The above method for wireless communication between the active pen and the first touch screen is applicable to the method for wireless communication between the active pen and the second touch screen. For example, the active pen sends the coding signal to the second touch screen, and in response to the active pen being within the preset distance from the second touch screen, the second touch screen receives the coding signal; or in response to the active pen being within the preset distance from the second touch screen, the active pen sends the coding signal to the second touch screen within a designated period of time after the uplink signal being detected by the active pen. Herein, the preset distance is less than or equal to 10 mm. In some embodiments, the preset distance ranges from 5 mm to 10 mm. For example, in response the second touch screen detecting that the strength of the coding signal is greater than the first threshold and the number of times that the coding signal is detected is greater than the second threshold, the active pen receives the wireless signal sent by the second touch screen. The wireless signal carries the identification information of the second touch screen.

Figure 9:
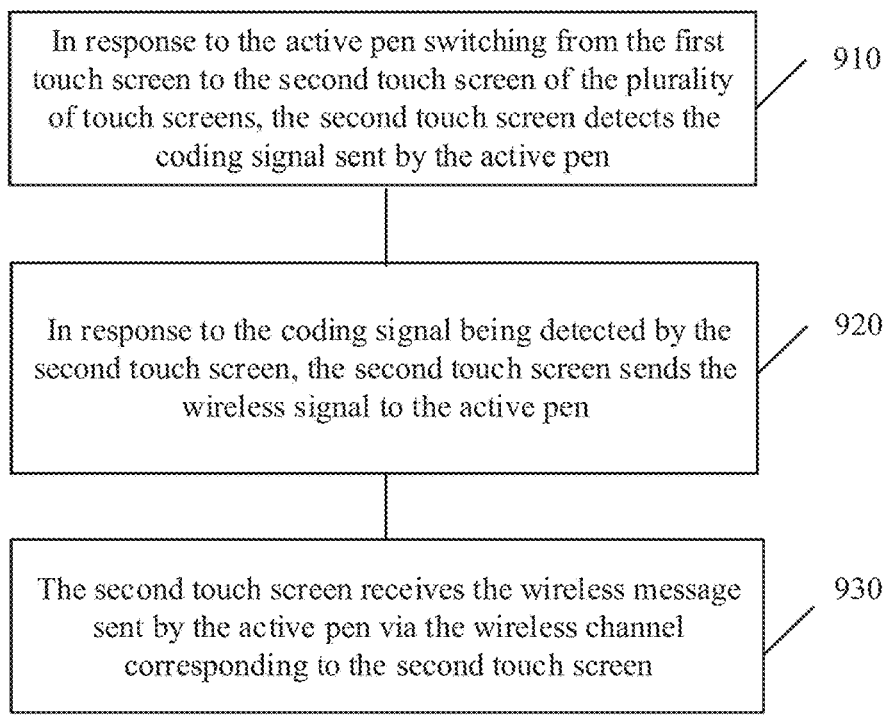
FIG. 9 is a schematic diagram of a method for wireless communication according to some embodiments of the present disclosure.

FIG. 9 is a schematic diagram of some embodiments of the method 400, and the process as shown in FIG. 9 may be performed by any one of the plurality of touch screens that may cooperate with the active pen.

In operation 910, in response to the active pen switching from the first touch screen to the second touch screen of the plurality of touch screens, the second touch screen detects the coding signal sent by the active pen.

In operation 920, in response to the coding signal being detected by the second touch screen, the second touch screen sends the wireless signal to the active pen.

Herein, the wireless signal is transmitted through the wireless channel corresponding to the active pen and carries the identification information of the second touch screen.

The identification information of the second touch screen is different from the identification information of the first touch screen, so that the active pen may detect that the active pen has switched from the first touch screen to the second touch screen.

In operation 930, the second touch screen receives the wireless message sent by the active pen via the wireless channel corresponding to the second touch screen.

The above method for wireless communication between the first touch screen and the active pen is applicable to the method for wireless communication between the second touch screen and the active pen. For example, the active pen sends the coding signal to the second touch screen, and in response to the second touch screen being within the preset distance from the active pen, the second touch screen receives the coding signal sent by the active pen. Alternatively, the second touch screen sends the uplink signal to the active pen, and in response to the second touch screen being within the preset distance from the active pen, the second touch screen receives the coding signal sent by the active pen in a designated period of time after the second touch screen sends the uplink signal. In some embodiments, the preset distance ranges from 5 mm to 10 mm. In some embodiments, the second touch screen may not send a wireless signal carrying the identification information of the second touch screen to the active pen until the second touch screen detects that the strength of the coding signal is greater than the first threshold and the number of times that the coding signal is detected is greater than the second threshold.

Since different touch screens use different wireless channels, the touch screen sends the wireless signal carrying its identification information to the active pen. In this way, the active pen can identify the touch screen that is currently in contact with or close to the active pen through the identification information carried in the wireless signal, and then send the wireless signal using the wireless channel corresponding to the touch screen. And the touch screen receives the wireless message using its corresponding wireless channel.

Figure 10:
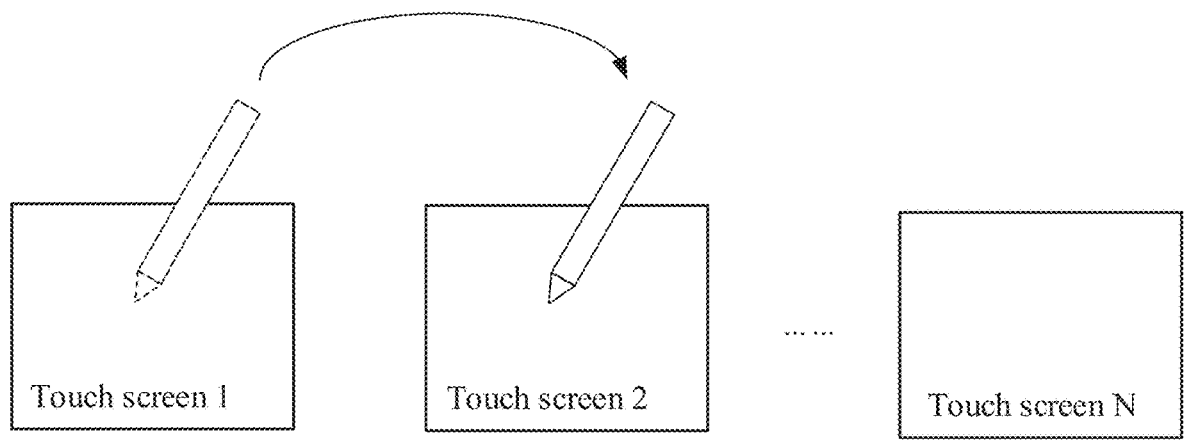
FIG. 10 is a schematic diagram of an active pen switching among a plurality of touch screens.

Referring to FIG. 10, a plurality of touch screens are illustrated in FIG. 10. The active pen may establish a wireless connection with the plurality of touch screens and may write on the plurality of touch screens. Each of the plurality of touch screens has its own identification, i.e., number, such as identification "1" to identification "N" as shown in FIG. 10. In the embodiments of the present disclosure, the active pen may switch among these N touch screens, for example, from a surface of touch screen 1 to a surface of touch screen 2. In an example, the active pen is on the surface of the touch screen 1 and is used to write on the touch screen 1. In this case, the touch screen 1 may detect that the signal strength of the coding signal sent by the active pen is greater than the first threshold. When it is detected that the signal strength of the coding signal is greater than the first threshold and the number of times that the coding signal is detected is greater than the second threshold, the coding signal is stable, and it is indicated that the code signal is detected by touch screen 1. In response, the touch screen 1 sends the wireless signal carrying identification information corresponding to the touch screen 1 to the active pen and requests the active pen to send pressure information to the touch screen 1. When the active pen detects the identification information corresponding to touch screen 1, it can be determined that the detected pressure information is to be sent using the wireless channel corresponding to the touch screen 1.

When the active pen moves from the surface of the touch screen 1 to the surface of the touch screen 2 for writing, the signal strength of the coding signal and the number of times that the valid coding signal is detected by the touch screen 1 may decrease, so that the signal strength of the coding signal decreases below the first threshold or the number of times that the valid coding signal is detected decreases below the second threshold. Due to the instability of the coding signal, the touch screen 1 may not send the wireless signal carrying the identification information corresponding to the touch screen 1 to the active pen. The active pen approaches the touch screen 2, so that the signal strength of the coding signal detected by the touch screen 2 increases and is greater than the first threshold. When the number of times that the coding signal greater than the first threshold is detected is greater than the second threshold, the coding signal is stable, and it is indicated that the coding signal is detected by the touch screen 2. At this time, the wireless signal sent by the touch screen 2 to the active pen carries the identification information corresponding to the touch screen 2. Upon detecting that the identification information in the wireless signal changes from the identification information corresponding to the touch screen 1 to the identification information corresponding to touch screen 2, the active pen is to switch to the wireless channel corresponding to the touch screen 2, so as to use the wireless channel corresponding to the touch screen 2 to send the pressure information.

As can be seen, with the method according to the embodiments of the present disclosure, the active pen may switch between the wireless channels depending on the real-time usage conditions and transmit the wireless message to a specific device directionally. In this way, seamless switching among different touch screens and accurate transmission of the wireless message can be realized.

Figure 11:
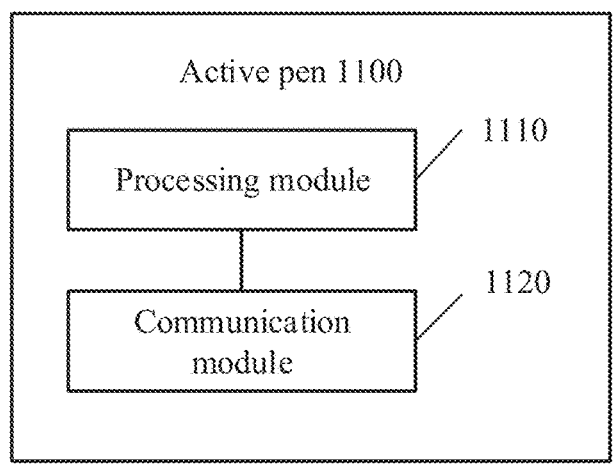
FIG. 11 is a schematic block diagram of an active pen according to some embodiments of the present disclosure.

Embodiments of the present disclosure further provide an active pen for wireless communication with a plurality of touch screens. The plurality of touch screens and the active pen correspond to a plurality of wireless channels, respectively, and a respective wireless channel is used for wireless communication between a touch screen and the active pen. As shown in FIG. 11, the active pen 1100 includes:
  a processing module 1110 configured to send a coding signal to a first touch screen, and the coding signal is configured for the first touch screen to determine information on a position of the active pen on the first touch screen;
  the processing module 1110 is further configured to receive a wireless signal sent by the first touch screen, and the wireless signal is transmitted through a wireless channel corresponding to the active pen and carries identification information of the first touch screen; and
  the processing module 1110 is further configured to detect, among the plurality of touch screens, the first touch screen that is currently close to or in contact with the active pen according to the identification information of the first touch screen; and
  a communication module 1120 configured to send a wireless message to the first touch screen via the wireless channel corresponding to the first touch screen.

The active pen identifies, among the plurality of touch screens, the touch screen that is currently close to or in contact with the active pen by sending the coding signal and receiving the wireless signal carrying identification information sent by the touch screen, and sends the wireless message to the touch screen using the wireless channel corresponding to the touch screen. In this way, accurate transmission of the wireless message between the active pen and the plurality of touch screens can be realized.

In some embodiments, the identification information is a device identification corresponding to the first touch screen or a channel identification of the wireless channel corresponding to the first touch screen.

In some embodiments, the wireless message includes information on a pressure generated by the active pen on the first touch screen.

In some embodiments, the processing module 1110 is specifically configured to: send the coding signal to the first touch screen, to enable the first touch screen to receive the coding signal in response to the active pen being within the preset distance from the first touch screen. The preset distance is less than or equal to 10 mm.

In some embodiments, the processing module 1110 is specifically configured to: in response to the active pen being within the preset distance from the first touch screen, send the coding signal to the first touch screen in a designated period of time after an uplink signal being detected. The preset distance is less than or equal to 10 mm.

In some embodiments, the preset distance ranges from 5 mm to 10 mm.

In some embodiments, the processing module is further configured to: receive the wireless signal sent by the first touch screen in response to the first touch screen detecting that the strength of the coding signal is greater than a first threshold and a number of times that the coding signal is detected is greater than a second threshold. The first threshold and the second threshold are each greater than 0.

In some embodiments, the processing module is configured to: in response to the active pen switching from the first touch screen to a second touch screen of the plurality of touch screens, send the coding signal to the second touch screen. In response to the coding signal being detected by the second touch screen, the processing module is configured to receive a wireless signal sent by the second touch screen. The wireless signal is transmitted through the wireless channel corresponding to the active pen and carries identification information of the second touch screen. The processing module is further configured to detect that the active pen has switched from the first touch screen to the second touch screen according to the identification information of the second touch screen different from that of the first touch screen. The communication module is configured to send the wireless message to the second touch screen via a wireless channel corresponding to the second touch screen.

In some embodiments, the wireless signal includes a plurality of bits, and the plurality of bits includes an identification segment for representing the identification information.

In some embodiments, the plurality of bits further includes at least one of a check segment, an auxiliary command segment, and a command header segment.

In some embodiments, the command header segment is configured to represent a pressure request of the first touch screen.

In some embodiments, the wireless communication includes Bluetooth communication.

It should be understood that the above and other operations and/or functions of the various modules of the active pen 1100 according to the embodiments of the present disclosure as shown in FIG. 11 are intended to implement the corresponding processes performed by the active pen in the method of wireless communication in FIG. 3, respectively, and will not be repeated herein for brevity.

Figure 12:
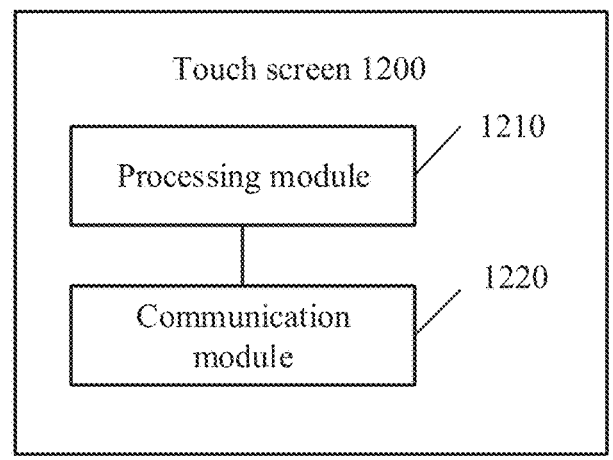
FIG. 12 is a schematic block diagram of a touch screen according to some embodiments of the present disclosure.

Embodiments of the present disclosure further provide a touch screen for wireless communication with an active pen. A plurality of touch screens and the active pen correspond to a plurality of wireless channels, respectively. A respective wireless channel is used for wireless communication between the touch screen and the active pen. As shown in FIG. 12, the touch screen 1200 includes:

a processing module 1210 configured to detect a coding signal sent by the active pen, and the coding signal is configured for a first touch screen to determine information on a position of the active pen on the first touch screen;

the processing module is further configured to send a wireless signal to the active pen in response to the coding signal being detected, the wireless signal is transmitted through a wireless channel corresponding to the active pen and carries identification information of the first touch screen, and the identification information of the first touch screen is configured for the active pen to detect, among the plurality of touch screens, the first touch screen that is currently close to or in contact with the active pen; and a communication module 1220 configured to receive a wireless message sent by the active pen via a wireless channel corresponding to the first touch screen.

Since different touch screens use different wireless channels, the touch screen sends the wireless signal carrying its identification information to the active pen. Thus, the active pen can detect the touch screen that is currently in contact with or close to the active pen through the identification information carried in the wireless signal, and then send the wireless signal using the wireless channel corresponding to the touch screen. In this way, accurate transmission of the wireless message between the active pen and the plurality of touch screens can be realized.

In some embodiments, the identification information is a device identification corresponding to the first touch screen or a channel identification of a wireless channel corresponding to the first touch screen.

In some embodiments, the wireless message includes information on a pressure generated by the active pen on the first touch screen.

In some embodiments, the processing module 1210 is specifically configured to: receive a coding signal sent by the active pen in response to the first touch screen being within a preset distance from the active pen. The preset distance is less than or equal to 10 mm.

In some embodiments, the processing module 1210 is specifically configured to: send an uplink signal to the active pen, in response to the first touch screen being within the preset distance from the active pen, the active pen receives the uplink signal; and receive a coding signal sent by the active pen in a designated period of time after the first touch screen sends the uplink signal. The preset distance is less than or equal to 10 mm.

In some embodiments, the preset distance ranges from 5 mm to 10 mm.

In some embodiments, the processing module 1210 is further configured to: send the wireless signal to the active pen in response to the first touch screen detecting that a strength of the coding signal is greater than a first threshold and a number of times that the coding signal is detected is greater than a second threshold. The first threshold and the second threshold are each greater than 0.

In some embodiments, the processing module 1210 is configured to: detect the coding signal sent by the active pen in response to the active pen switching from the first touch screen to a second touch screen of the plurality of touch screens. The processing module is configured to send the wireless signal to the active pen in response to the coding signal being detected. The wireless signal is transmitted through a wireless channel corresponding to the active pen and carries identification information of the second touch screen. The identification information of the second touch screen is different from the identification information of the first touch screen, to enable the active pen to detect a switching from the first touch screen to the second touch screen. The communication module is configured to receive the wireless message sent by the active pen via the wireless channel corresponding to the second touch screen.

In some embodiments, the wireless signal includes a plurality of bits, and the plurality of bits includes an identification segment for representing the identification information.

In some embodiments, the plurality of bits further includes at least one of a check segment, an auxiliary command segment, and a command header segment.

In some embodiments, the command header segment is configured to represent a pressure request of the first touch screen.

In some embodiments, the wireless communication includes Bluetooth communication.

It should be understood that the above and other operations and/or functions of the various modules of the touch screen 1200 according to the embodiments of the present disclosure as shown in FIG. 12 are intended to implement the corresponding processes performed by the first touch screen in the method for wireless communication in FIG. 4, respectively, and will not be repeated herein for brevity.

Embodiments of the present disclosure provide an active pen chip configured for the active pen to perform the method for wireless communication in any of the above aspects.

Embodiments of the present disclosure provide a touch chip configured for the touch screen to perform the method for wireless communication in any of the above aspects.

Figure 13:
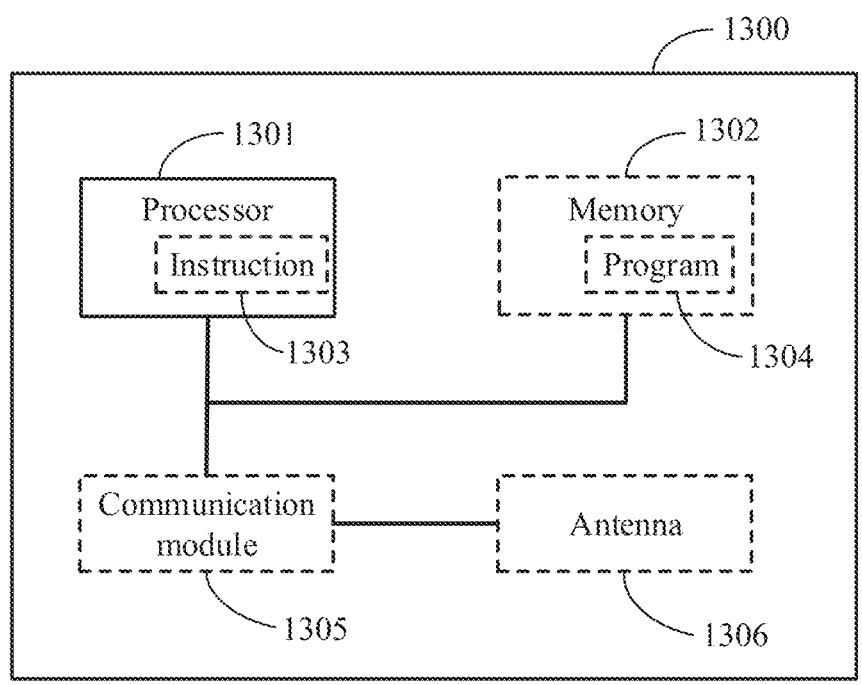
FIG. 13 is a schematic block diagram of a communication device according to some embodiments of the present disclosure.

Embodiments of the present disclosure further provide a communication device. As shown in FIG. 13, a communication device 1300 is configured to implement the method described in the above method embodiments. The dashed box in FIG. 13 indicates that the unit or module is optional.

The communication device 1300 includes at least one processor 1301. The processor 1301 may support the communication device 1300 in implementing the methods in the method embodiments corresponding to FIGS. 3 to 9. The processor 1301 may be a general-purpose processor or a dedicated processor. For example, the processor 1301 may be a central processing unit (CPU), a micro-programmed control unit (MCU), etc. The processor 1301 may be configured to control the communication device 1300, execute a software program, and process data from the software program. The communication device 1300 may further include a communication module 1305 to realize input and output of signals.

For example, the communication device 1300 may be a chip, and the communication module 1305 may be an input circuit and/or output circuit for the chip. Alternatively, the communication module 1305 may be a communication interface for the chip, and the chip may be used as a component of an active pen, a touch screen, or other wireless communication device.

Another example is that the communication device 1300 may be the active pen, the touch screen, or an electronic device to which the touch screen is applied. The communication module 1305 may be a transceiver for the active pen, the touch screen, or the electronic device. Alternatively, the communication module 1305 may be a transceiver circuit for the active pen, the touch screen, or the electronic device.

The communication device 1300 may include at least one memory 1302 having a program 1304 stored thereon. The program 1304 can be run by the processor 1301 to generate an instruction 1303, causing the processor 1301 to perform the method as described in the method embodiments above in accordance with the instruction 1303. In some embodiments, there may also be data stored in the memory 1302. In some embodiments, the processor 1301 may also read the data stored in the memory 1302. The data may be stored at the same storage address as the program 1304, or may be stored at a different storage address from the program 1304.

The processor 1301 and the memory 1302 may be provided separately or may be integrated together.

The communication device 1300 may also include an antenna 1306. The communication module 1305 is configured to implement the transceiver function of the communication device 1300 via the antenna 1306.

The specific manner in which the processor 1301 performs the communication method may be found in the relevant description in the method embodiment.

It should be understood that the operations of the method embodiments as described above may be performed by logic circuits in the form of hardware or instructions in the form of software in the processor 1301. The processor 1301 may be a CPU, a digital signal processor (DSP), an application specific integrated circuit (ASIC), a field programmable gate array (FPGA), or other programmable logic device, such as a discrete gate, a transistor logic device, or a discrete hardware component.

The present disclosure further provides a computer program product that, when executed by the processor 1301, implements the method as described in any of the method embodiments of the present disclosure.

The computer program product may be stored in a memory 1302. The computer program product may be, for example, a program 1304 that is ultimately converted to an executable target file capable of being executed by the processor 1301 through processing such as preprocessing, compiling, assembling, and linking.

The present disclosure further provides a computer readable storage medium having a computer program stored thereon. The computer program, when executed by the computer, implements the method as described in any of the method embodiments of the present disclosure. The computer program may be a high-level language program, or may be an executable target program.

The computer readable storage medium may be, for example, the memory 1302. The memory 1302 may be a volatile memory or a non-volatile memory, or, memory 1302 may include both the volatile memory and the non-volatile memory. Herein, the non-volatile memory may be a read-only memory (ROM), a programmable ROM (PROM), an erasable PROM (EPROM), an electrically EPROM (EEPROM), or a flash memory. The volatile memory may be a random access memory (RAM), which is used as an external cache. By way of illustration, but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM).

Embodiments of the present disclosure further provide an electronic device, including a touch screen in the various embodiments of the present disclosure as described above.

Embodiments of the present disclosure further provide a communication system, including an active pen and an electronic device in the various embodiments of the present disclosure as described above.

It should be noted that, without conflict, the technical features of the various embodiments and/or individual embodiment described in the present disclosure may be arbitrarily combined with each other, and the technical solutions obtained after the combination shall also fall within the protection scope of the present disclosure.

The systems, devices and methods disclosed in the embodiments of the present disclosure may be implemented in other ways. For example, some features of the method embodiments described above may be ignored or not implemented. The above described device embodiments are only schematic, the division of units is only a logical functional division, the actual implementation may have another division, multiple units or components may be combined or may be integrated into another system. In addition, the coupling between the units or between the components may be direct or indirect, and the above coupling includes electrical, mechanical or other forms of connection.

It will be clear to those skilled in the art that for the convenience and brevity of the description, the specific working processes of the devices and equipment described above, as well as the technical effects produced, can be referred to the corresponding processes and technical effects in the aforementioned method embodiments and will not be repeated here.

It should be understood that the specific examples in the embodiments of the present disclosure are only to help the person skilled in the art to better understand the embodiments of the present disclosure, not to limit the scope of the embodiments of the present disclosure, and the person skilled in the art can make various improvements and deformations on the basis of the above embodiments, and these improvements or deformations all fall within the protection scope of the present disclosure.

The above mentioned is only a specific implementation of the present disclosure, but the protection scope of the present disclosure is not limited to this, and any changes or substitutions that can be easily thought of by a person skilled in the art within the technical scope disclosed in the present disclosure shall be covered within the protection scope of the present disclosure. Therefore, the protection scope of the present disclosure shall be subject to the protection scope of the claims.

What is claimed is:

1. A method for wireless communication, comprising:
at an active pen that communicates with a plurality of touch screens:
in response to the active pen being within a preset distance from a first touch screen of the plurality of touchscreens, detecting, by the active pen, an uplink signal sent by the first touch screen, wherein the preset distance is less than or equal to 10 mm;
sending, by the active pen, a coding signal to the first touch screen in a designated period of time after the uplink signal has been detected, wherein the coding signal is configured for the first touch screen to determine information about a position of the active pen on the first touch screen;
receiving, by the active pen, a first wireless signal sent by the first touch screen in response to the first touch screen detecting that a strength of the coding signal is greater than a first threshold and a number of times that the coding signal is detected is greater than a second threshold, wherein the first threshold and the second threshold are each greater than 0, and wherein the first wireless signal carries identification information of the first touch screen;
detecting, by the active pen, among the plurality of touch screens, the first touch screen as a touch screen that is currently close to or in contact with the active pen according to the identification information of the first touch screen;
receiving, by the active pen, a second wireless signal sent by a second touch screen after the active pen is switched from the first touch screen to the second touch screen of the plurality of touch screens, wherein the second wireless signal carries identification information of the second touch screen; and
detecting, by the active pen, that the active pen has switched from the first touch screen to the second touch screen according to the identification information of the second touch screen different from the identification information of the first touch screen.

2. The method according to claim 1, wherein the active pen communicates with the plurality of touch screens through a plurality of wireless channels, each wireless channel of the plurality of wireless channels corresponds to a respective touch screen of the plurality of touch screens and is configured for wireless communication between the respective touch screen and the active pen; and
wherein the identification information of the first touch screen is channel identification of a wireless channel corresponding to the first touch screen.

3. The method according to claim 2, further comprising:
sending, by the active pen, a wireless message to the first touch screen through the wireless channel corresponding to the first touch screen;
wherein the wireless message comprises information on a pressure generated by the active pen on the first touch screen.

4. The method according to claim 1, wherein before receiving the first wireless signal sent by the first touch screen, the method further comprises:
sending, by the active pen, a coding signal to the first touch screen, wherein the coding signal is configured for the first touch screen to determine information on a position of the active pen on the first touch screen;
wherein the first touch screen is configured to receive the coding signal in response to the active pen being within a preset distance from the first touch screen; and
wherein the preset distance is less than or equal to 10 mm.

5. The method according to claim 4, wherein receiving, by the active pen, the first wireless signal sent by the first touch screen comprises:
in response to the first touch screen detecting that a strength of the coding signal is greater than a first threshold and a number of times that the coding signal is detected is greater than a second threshold, receiving, by the active pen, the first wireless signal;
wherein the first threshold and the second threshold are each greater than 0.

6. The method according to claim 1, wherein the first wireless signal comprises a plurality of bits, the plurality of bits comprises an identification segment for representing the identification information of the first touch screen, and further comprises at least one of a check segment, an auxiliary command segment and a command header segment; and
wherein the command header segment is configured to represent a pressure request of the first touch screen.

7. The method according to claim 1, wherein the first wireless signal and the second wireless signal are transmitted through another wireless channel corresponding to the active pen.

8. The method according to claim 1, wherein the identification information of the first touch screen is identification of a master device using the first touch screen.

9. A method for wireless communication, comprising:
at a first touch screen and a second touch screen of a plurality of touch screens that communicate with an active pen:
sending, by the first touch screen, an uplink signal to the active pen, wherein the active pen is configured to receive the uplink signal in response to the active pen being within a preset distance from the first touch screen, and wherein the preset distance is less than or equal to 10 mm; and
receiving, by the first touch screen, a coding signal sent by the active pen in a designated period of time after the first touch screen sends the uplink signal, wherein the coding signal is configured for the first touch screen to determine information about a position of the active pen on the first touch screen;

sending, by the first touch screen, a first wireless signal to the active pen in response to the first touch screen detecting that a strength of the coding signal is greater than a first threshold and a number of times that the coding signal is detected is greater than a second threshold, wherein the first threshold and the second threshold are each greater than 0, and wherein the first wireless signal carries identification information of the first touch screen, the identification information of the first touch screen is configured for the active pen to detect, among the plurality of touch screens, the first touch screen that is currently close to or in contact with the active pen;

sending, by the second touch screen, a second wireless signal to the active pen after the active pen is switched from the first touch screen to the second touch screen of the plurality of touch screens, wherein the second wireless signal carries identification information of the second touch screen, the identification information of the second touch screen is different from the identification information of the first touch screen, to enable the active pen to detect a switching from the first touch screen to the second touch screen.

10. The method according to claim 9, wherein the plurality of touch screens communicate with the active pen through a plurality of wireless channels, each wireless channel of the plurality of wireless channels corresponds to a respective touch screen of the plurality of touch screens and is configured for wireless communication between the respective touch screen and the active pen; and wherein the identification information of the first touch screen is channel identification of a wireless channel corresponding to the first touch screen.

11. The method according to claim 10, further comprising:

receiving, by the first touch screen, a wireless message sent by the active pen through the wireless channel corresponding to the first touch screen;

wherein the wireless message comprises information on a pressure generated by the active pen on the first touch screen.

12. The method according to claim 9, wherein before sending the first wireless signal to the active pen, the method further comprises:

in response to the active pen being within a preset distance from the first touch screen, receiving, by the first touch screen, a coding signal sent by the active pen, wherein the coding signal is configured for the first touch screen to determine information on a position of the active pen on the first touch screen;

wherein the preset distance is less than or equal to 10 mm.

13. The method according to claim 12, wherein sending the first wireless signal to the active pen, comprises:

in response to the first touch screen detecting that a strength of the coding signal is greater than a first threshold and a number of times that the coding signal is detected is greater than a second threshold, sending, by the first touch screen, the first wireless signal to the active pen;

wherein the first threshold and the second threshold are each greater than 0.

14. The method according to claim 9, wherein the first wireless signal comprises a plurality of bits, the plurality of bits comprises an identification segment for representing the identification information of the first touch screen, and further comprises at least one of a check segment, an auxiliary command segment and a command header segment; and wherein the command header segment is configured to represent a pressure request of the first touch screen.

15. The method according to claim 9, wherein the identification information of the first touch screen is identification of a master device using the first touch screen.

16. An active pen for wireless communication with a plurality of touch screens, wherein the active pen comprises:

a processing module, configured to:

detect an uplink signal sent by a first touch screen of the plurality of touchscreens in response to the active pen being within a preset distance from the first touch screen, wherein the preset distance is less than or equal to 10 mm;

sending a coding signal to the first touch screen in a designated period of time after the uplink signal has been detected, wherein the coding signal is configured for the first touch screen to determine information about a position of the active pen on the first touch screen;

receive a first wireless signal sent by the first touch screen in response to the first touch screen detecting that a strength of the coding signal is greater than a first threshold and a number of times that the coding signal is detected is greater than a second threshold, wherein the first threshold and the second threshold are each greater than 0, and wherein the first wireless signal carries identification information of the first touch screen;

detect, among the plurality of touch screens, the first touch screen that is currently close to or in contact with the active pen according to the identification information of the first touch screen;

receive a second wireless signal sent by a second touch screen after the active pen is switched from the first touch screen to the second touch screen of the plurality of touch screens, wherein the second wireless signal carries identification information of the second touch screen; and detect that the active pen has switched from the first touch screen to the second touch screen according to the identification information of the second touch screen different from the identification information of the first touch screen.

* * * * *